(12) United States Patent
Kanzaki et al.

(10) Patent No.: US 7,990,458 B2
(45) Date of Patent: Aug. 2, 2011

(54) DIGITAL CAMERA

(75) Inventors: Tomohiko Kanzaki, Tokyo (JP); Toshihiro Hamamura, Tokyo (JP)

(73) Assignee: Hoya Corporation, Tokyo (JP)

( * ) Notice: Subject to any disclaimer, the term of this patent is extended or adjusted under 35 U.S.C. 154(b) by 405 days.

(21) Appl. No.: 12/331,706

(22) Filed: Dec. 10, 2008

(65) Prior Publication Data

US 2009/0153709 A1    Jun. 18, 2009

(30) Foreign Application Priority Data

Dec. 14, 2007   (JP) ................................ 2007-323815

(51) Int. Cl.
H04N 5/222   (2006.01)
(52) U.S. Cl. .............................. 348/333.12; 348/333.02
(58) Field of Classification Search ............. 348/333.13, 348/333.02
See application file for complete search history.

(56) References Cited

U.S. PATENT DOCUMENTS

| | | | |
|---|---|---|---|
| 7,440,116 B2 * | 10/2008 | Bankhead et al. ............ | 356/515 |
| 2005/0104997 A1 * | 5/2005 | Nonaka ......................... | 348/360 |
| 2005/0275738 A1 | 12/2005 | Arai | |
| 2006/0110156 A1 | 5/2006 | Kurosawa | |
| 2007/0151066 A1 | 7/2007 | Seo | |
| 2008/0049119 A1 | 2/2008 | Yamamoto | |
| 2008/0055433 A1 * | 3/2008 | Steinberg et al. ............. | 348/241 |
| 2008/0175582 A1 | 7/2008 | Furumochi | |

FOREIGN PATENT DOCUMENTS

JP    2005-341381    12/2005

OTHER PUBLICATIONS

English language Abstract of JP 2005-341381, Dec. 8, 2005.
U.S. Appl. No. 12/331,705 to Okamoto, filed Dec. 10, 2008.

* cited by examiner

Primary Examiner — James M Hannett
(74) Attorney, Agent, or Firm — Greenblum & Bernstein, P.L.C.

(57) ABSTRACT

A digital camera has an image-capturing device, an image processor, and a display. The image-capturing device creates a cleaning image which is used for pinpointing dust particles attached to an image sensor. The image processor creates an inverted cleaning image so that the top and bottom of a subject image provided on the image sensor match the top and bottom of a subject image included in the cleaning image. The display displays the inverted cleaning image.

9 Claims, 12 Drawing Sheets

CAMERA (LCD)

CAMERA (LCD)

DIGITAL CAMERA

BACKGROUND OF THE INVENTION

1. Field of the Invention

The present invention relates to a digital camera, and more particularly to a digital camera having an image sensor which may be cleaned by the user.

2. Description of the Related Art

A conventional digital camera may have a detachable lens. A subject image entering through the lens is directed to an optical finder through a return mirror. The user finds the subject image through the optical finder. When the user pushes a shutter release button, the return mirror is raised, a shutter curtain runs, and light from the subject arrives at an image sensor. The images sensor produces the subject image as an electrical signal, and outputs it as image data. The image data is processed and stored on a recording medium as an image file. The image sensor has a front surface which faces a photographic subject. A low-pass filter is attached onto the front surface of the image sensor. Hereinafter, it will be assumed that the image sensor has a low-pass filter attached to its front surface.

The image sensor is provided in a mirror box of a digital camera with movable elements such as a shutter curtain and a return mirror. These movable elements move with the taking of every photograph, and graze the supports of the movable elements, creating dust particles between the supports and the movable elements. Additionally, in the case of a digital camera having a detachable lens, dust particles may enter the mirror box when the lens is removed. These dust particles may become attached to the image sensor and block light arriving at the imaging sensor. Therefore, the dust particles may reduce quality of a photographed image.

To resolve this problem, Japanese Unexamined Patent Publication (KOKAI) No. 2005-341381 discloses that pixels having low output value in an image signal are detected, and the data for those pixels is corrected because dust particles are assumed to be attached at those pixel locations.

However, according to conventional constructions, pixel data may be uncorrectable if the number or size of the dust particles attached to the image sensor is large. Thus, the attached dust particles degrade the photographed image.

SUMMARY OF THE INVENTION

An object of the present invention is to provide a digital camera that indicates the location of dust particles attached to an image sensor, and encourages a user to maintenance a digital camera.

The present invention is a digital camera having an image-capturing device, an image processor, and a display. The image-capturing device creates a cleaning image which is used for pinpointing dust particles attached to an image sensor. The image processor creates an inverted cleaning image so that the top and bottom of a subject image provided on the image sensor match the top and bottom of a subject image included in the cleaning image. The display displays the inverted cleaning image.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
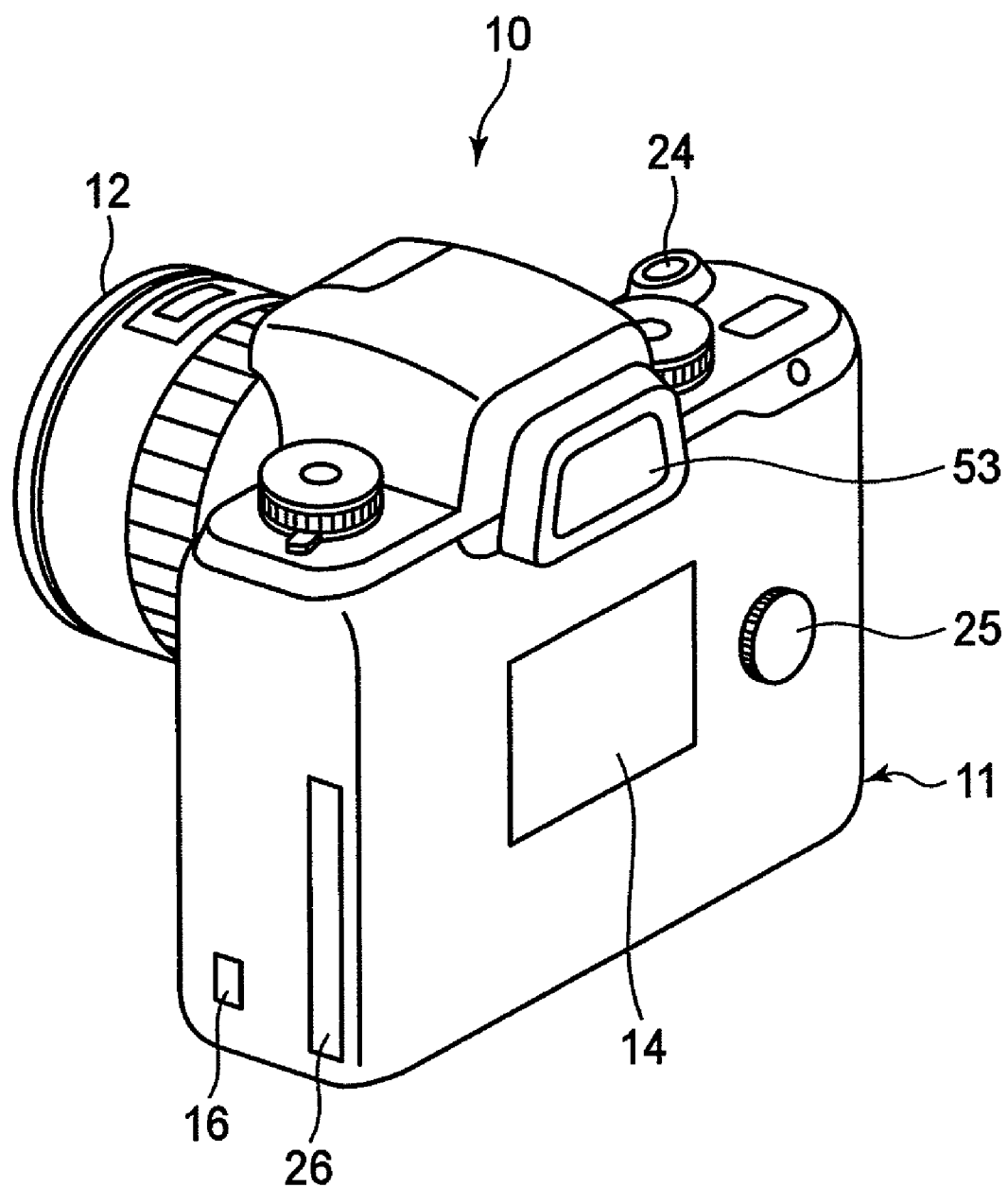
FIG. 1 is an external view of a lens and a digital camera in the first embodiment of the present invention.
Figure 2:
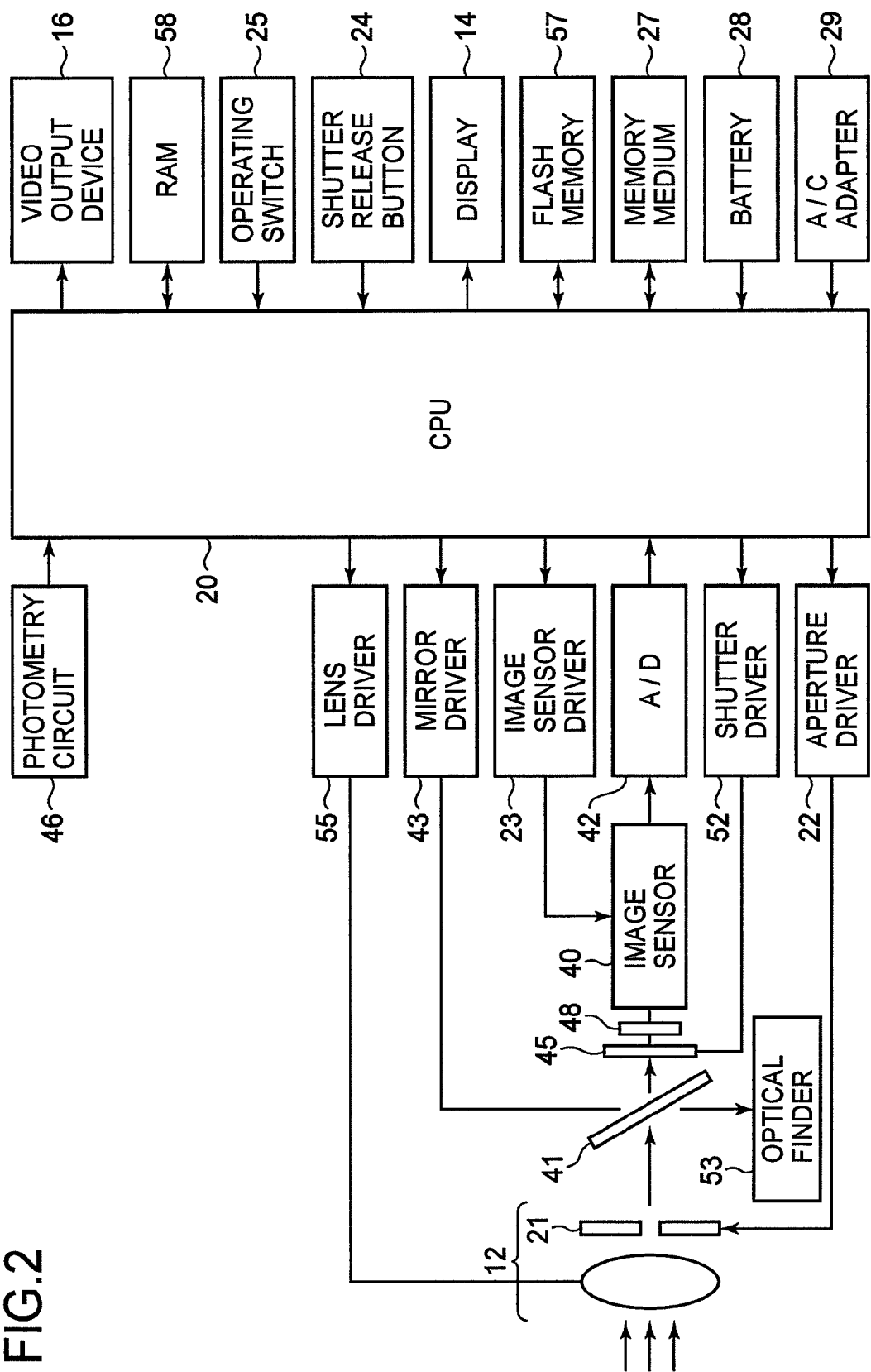
FIG. 2 is a block diagram showing a digital camera.

The first embodiment of a digital camera according to the present invention is described below with reference to the drawings. FIG. 1 is an external view of a digital camera which is a lens.

The construction of a digital camera 10 and lens 12 is described with FIGS. 1 to 5.

A digital camera 10 mainly comprises a body 11, a display 14 provided in the body 11, a shutter release button 24, an operating switch 25, a card slot 26, a video output device 16, and an optical finder 53.

A CPU 20 is provided in the digital camera 10. A flash memory 57 connected to the CPU 20 stores programs which the CPU executes. The CPU 20 reads the programs from the flash memory 57 and executes them when the digital camera 10 is powered.

The user may change configurations and operating modes of the digital camera 10 by operating the operating switch 25 according to certain rules. The operating modes include a photographing mode, an image viewing mode, a sensor cleaning mode, and so on. The photographing mode is used for photographing a subject, i.e., normal photographing. The image viewing mode is used for displaying an image file which is stored in the recording medium 27 on the display 14. The sensor cleaning mode is used for cleaning the image sensor 40 and is executed in the photographing mode and the image viewing mode.

When the user changes the operating mode, a configuration window is displayed on the display 14. The user may change the operating mode by operating the operating switch with reference to the configuration window. Hereinafter, the digital camera is described configured to photographing mode.

An aperture diaphragm 21 is provided in the lens 12, and controlled by an aperture driver 22 so as to open or close the aperture. A subject image entering through the lens 12 is directed to the optical finder 53 through a return mirror 41. The user finds the subject image through the optical finder 53.

When the user pushes the shutter release button 24, a photographing preparation signal is sent from the shutter release button 24 to the CPU 20. After receiving the photographing preparation signal, the CPU 20 controls the lens driver 55 so as to drive the lens 12 to focus on the subject. A photometry circuit 46 is controlled by the CPU 20 and sends exposure information to the CPU 20. The CPU 20 receives the exposure information, and calculates shutter speed and F-number using the exposure information.

When the shutter release button 24 is fully depressed by the user, an imaging operation is processed. The imaging operation starts from the transmission of signals to each circuit by the CPU 20 to the transmission of image data to the CPU 20. In detail, CPU 20 sends signals to the aperture driver 22, the mirror driver 43, and the shutter driver 52. The aperture driver 22 controls the aperture diaphragm 21. The shutter driver 52 opens and closes the shutter curtain 45. Therefore, the subject image is provided on the image sensor (CCD) 40 through low-pass filter 48.

Figure 3:
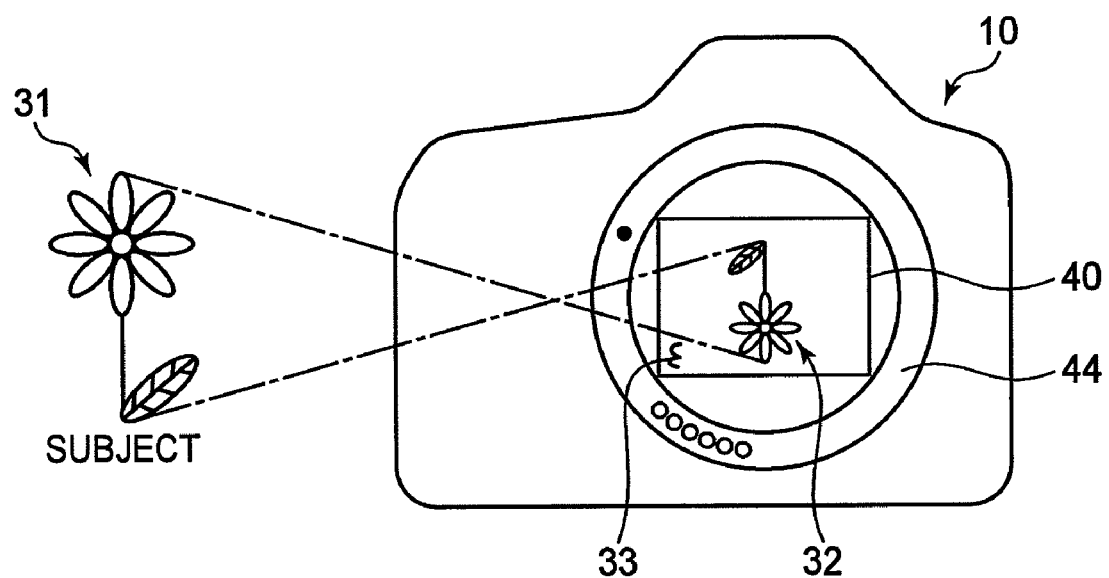
FIG. 3 is a schematic view showing a relationship between a photographic subject and the subject image which is formed on the image sensor.

Referring to FIG. 3, the subject 31 is provided on the image sensor 40 as the subject image 32 such that the subject 31 is inverted from top to bottom and right to left. The image sensor 40 is controlled by the image sensor driver 23 so as to take an image, and sends the image signal to the A/D converter 42. The A/D converter 42 converts the image signal to image data, and sends it to the CPU 20.

Next, the CPU20 processes the image data by temporarily storing it in RAM 58. In this processing, the CPU 20 inverts the image from top to bottom and right to left, adjusts color contrasts, and compresses it into JPEG format so that an image file is created. The image file is stored on the memory medium 27 which is inserted into the card slot 26. The memory medium 27 may be, for example an SD card™, a compact flash card™, and etc. These devices are powered by the battery 28 or the A/C adapter 29.

Figure 4:
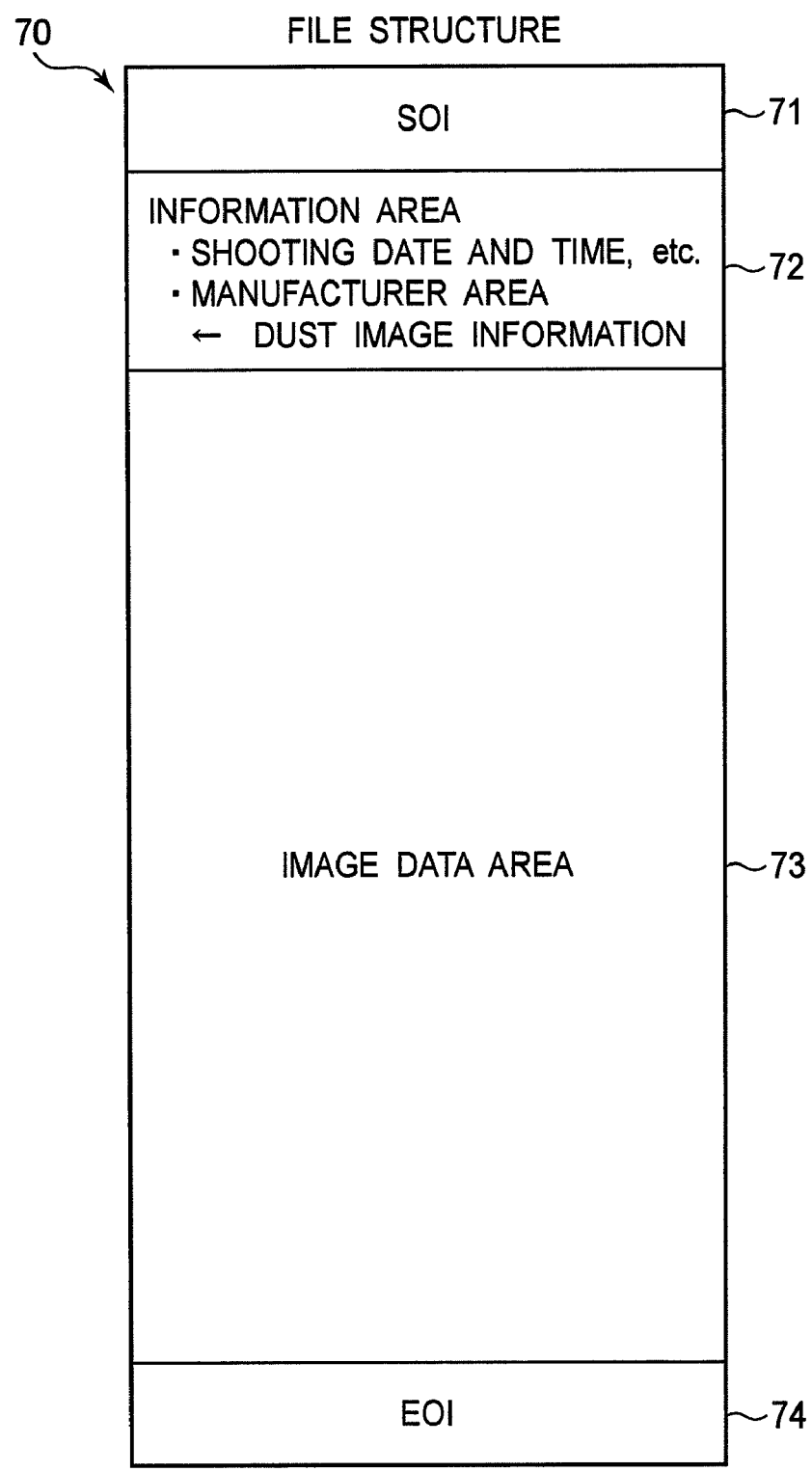
FIG. 4 is a schematic view showing the file structure of a cleaning image.

Referring to FIG. 4, an area which records tag information in the cleaning image file is described. The cleaning image file 70 is a binary file, and begins with as SOI marker. An information area is provided after the SOI marker.

Photographing information is recorded as tag information in the information area 72. An image data area 73 is provided after the information area 72, and stores the image data. An EOI marker 74 which indicates end of a file is recorded after the image data area 73, and stores the image data.

A manufacturer area is provided in the information area 72. A manufacture may freely utilize the manufacturer area. Dust-image information is recorded in the manufacturer area. Therefore, the dust-image information may be recorded in the cleaning image file 70 without interfering with the image data.

Figure 5:
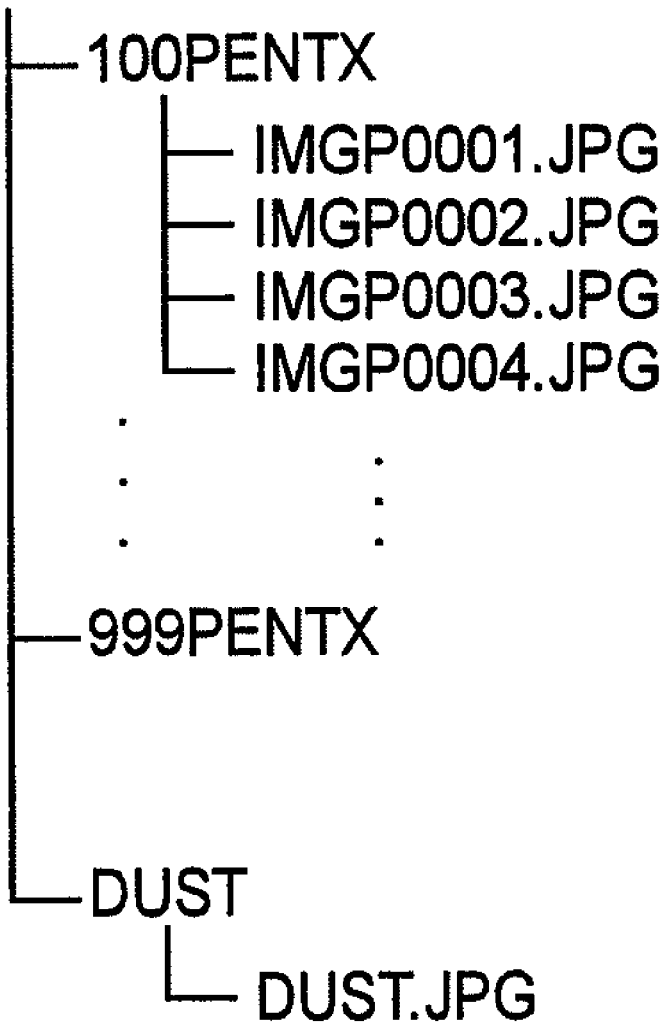
FIG. 5 is a schematic view showing the folder structure of the recording medium, arranged in a tree structure.

The image file is stored in the "100PENTX" folder which is provided in the root folder of the memory medium 27 (refer to FIG. 5). Three digits are added at the beginning of each folder name. The user may create folders from "100PENTX" to "999PENTX" by changing these numbers, and store image files in any folder. A folder having a name "DUST" is provided in the root folder of the memory medium 27. The cleaning image file, named, for example, "DUST.JPG", is referred to by the user when the user cleans the image sensor 40, and is stored in the "DUST" folder.

The image data stored on the memory medium is displayed on the display 14 by the user operating the operating switch 25. The image data displayed on the display 14 is erected because the image data is processed so that a subject image is erected. A displayed image on the display 14 is outputted as video signal from a video output device 16 to an exterior of the digital camera 10.

The CPU 20 may control the mirror driver 43 so as to keep up the return mirror 41, and to keep open the shutter curtain 45. This enables the user to clean the image sensor 40 from the outside of the digital camera 10. The CPU 20, the mirror driver 43, and the shutter driver 52 consume electricity.

Figure 6:
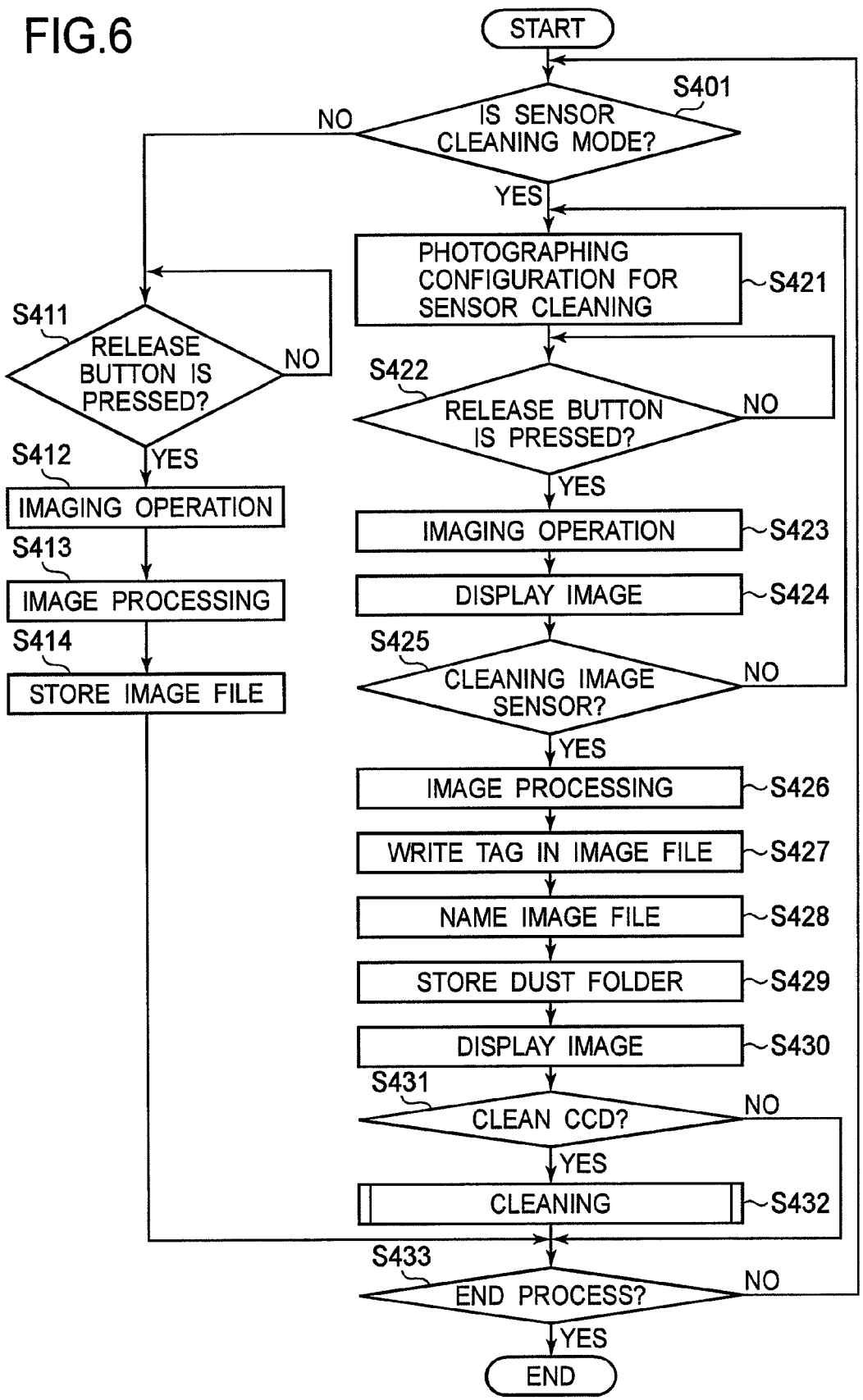
FIG. 6 is a flowchart showing a first cleaning-image display process.

The first cleaning-image display process is described below with reference to FIGS. 6 to 8. The first cleaning-image display process comprises ten steps from step S421 to step S430 in FIG. 6. The process described in FIG. 6 is executed in the case that the digital camera 10 is set to the photographic mode.

In step S401, it is judged whether the user has set the digital camera 10 to the sensor cleaning mode or not. In the case that the camera is not set to the sensor cleaning mode, the process proceeds to step S411. In step S411, it is judged whether the shutter release button 24 is pressed or not. In the case that the shutter release button 24 is pressed, the imaging operation is processed in step S412. Then, the CPU 20 processes an image in step S413 and stores an image file on the memory medium 27 in step S414. Otherwise, in the case that the digital camera 10 is set to the sensor cleaning mode in step S401, the process proceeds to step S421.

In step S421 to S423, the digital camera 10 photographs a cleaning image which the user refers to, to clean the image sensor 40. The cleaning image is created by photographing a white object covering the whole angle of view.

In step S421, the aperture diaphragm 21 is narrowed down at a minimum, and shutter speed is set to the slowest depending on the F-number. Focus of the lens 12 is set to infinity, exposure compensation is set to slightly strong, and image size is set to the largest among the sizes which the digital camera 10 is able to photograph.

In step S422, it is judged whether the shutter release button 24 is pressed or not. In the case that the shutter release button 24 is pressed, the imaging operation proceeds to step S423.

Next, in step S424, the photographed image is displayed on the display 14. In step S425, the user judges whether the photographed image is suitable for cleaning the image sensor 40 or not. A suitable image represents dust particles so as to be clearly identified by the user. In the case that the photographed image is suitable for cleaning, the user may select to clean the image sensor 40. Otherwise, the process returns to step S421, and a cleaning image is captured again.

In the case that the user selects to clean the image sensor 40, the process goes to step S426. In step S426, the CPU 20 processes an image and outputs a cleaning image file. This image processing allows the user to easily find dust particles included in a cleaning image, for example, by increasing the image contrast, and by inverting the image from left to right.

In the next step, S427, tag information is written to a cleaning image file. Tag information includes information associated with a cleaning image file, i.e., photographing information. Photographing information includes photographing date and time, shutter speed, F-number, ISO value, and so on. Dust image information is written in a cleaning image file as part of the tag information, and indicates that a file contains a cleaning image.

After writing, a cleaning image file is named in step S428. The file name of a cleaning image file indicates that a file contains a cleaning image, and is, for example, "DUST.JPG".

In the next step S429, a cleaning image file is stored in a "DUST" folder provided on the memory medium 27.

Figure 7:
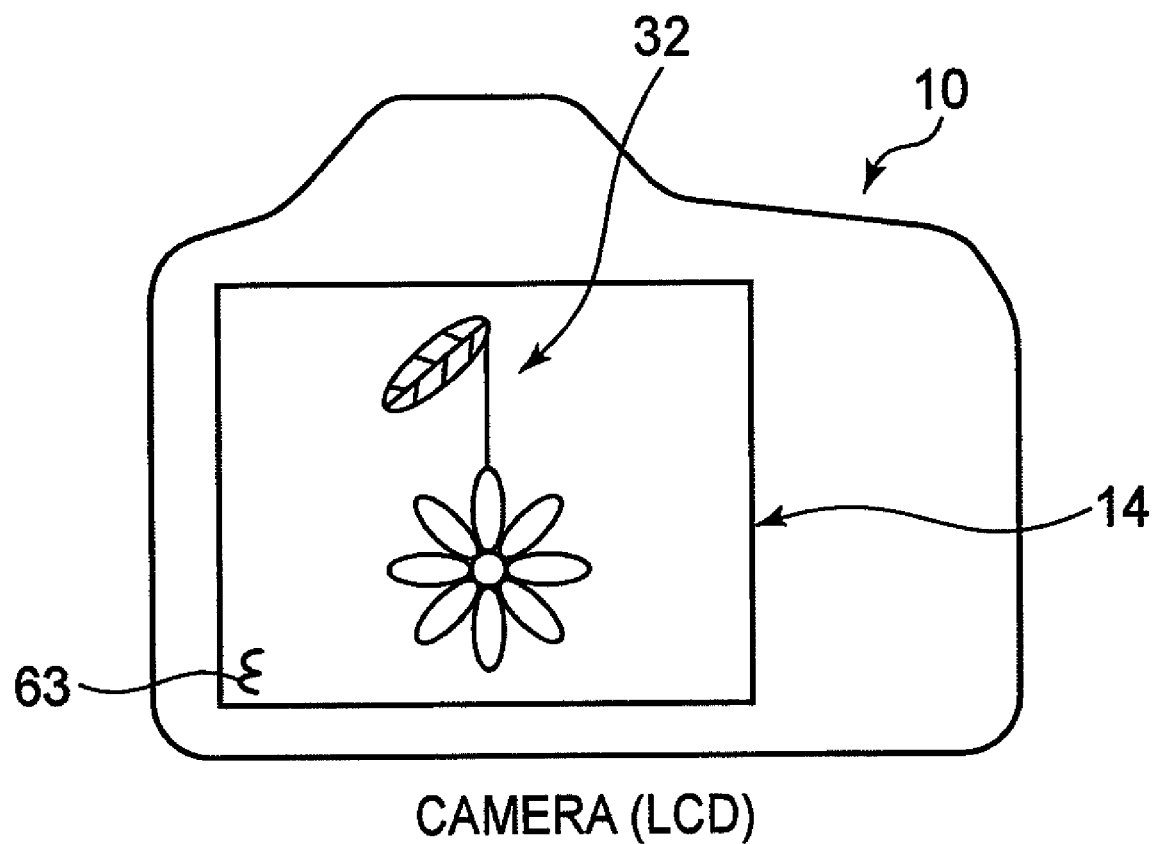
FIG. 7 is a schematic view showing a display which displays a cleaning image.

In the next step S430, a cleaning image file is displayed for a predetermined period, for example 5 minutes (refer to FIG. 7). Top and bottom of the cleaning image data is not inverted in the image processing of step S426. Therefore, the top and bottom of the cleaning image displayed on the display 14 is the same as the top and bottom of the image sensor 40 as seen from the lens mount 44 (refer to FIGS. 3 and 7).

Otherwise, the right and left of the cleaning image data is inverted in the image processing of step S426. Therefore, the cleaning image displayed on the display 14 corresponds from left to right with the image sensor 40 as seen from the lens mount 44 (refer to FIGS. 3 and 7). In other words, the location of a dust particle 63 is the right side on the image sensor 40 as seen from the back of the image sensor 40, and location of a dust particle 63 is left side on the display 14 (refer to FIG. 7). That is, the location of a dust particle 63 on the image sensor 40 as seen from the lens mount 44 and its location as displayed on the display 14 are homologous.

Thus, the user may precisely note the location of dust particle 33 which is attached to the image sensor 40.

The user may set the display period of the digital camera 10 in advance, so that consumption of the battery 28 will be reduced.

In step S431, the user operates the operating switch 25 and shutter release button 24 by referring to a cleaning image displayed on the display 14, and thereby decides whether to clean the image sensor 40. In the case that the user decides that cleaning is not needed, such as when dust particles are not found in a cleaning image, the process goes to step S433 without performing the cleaning process. In the case that the user decides that cleaning is needed, for example, when dust particles are found in a cleaning image, the process goes to step S432.

In step S432, the cleaning process described next is performed. After the cleaning process is performed, it is judged whether the user ends the photographing mode or not. In the case the photographing mode is not ended, the process goes to step S421 again. For example, the user may confirm that the dust particles were removed by taking another cleaning image and repeating the process. When the photographing mode is terminated, i.e. the process is not repeated, the process ends.

Figure 9:
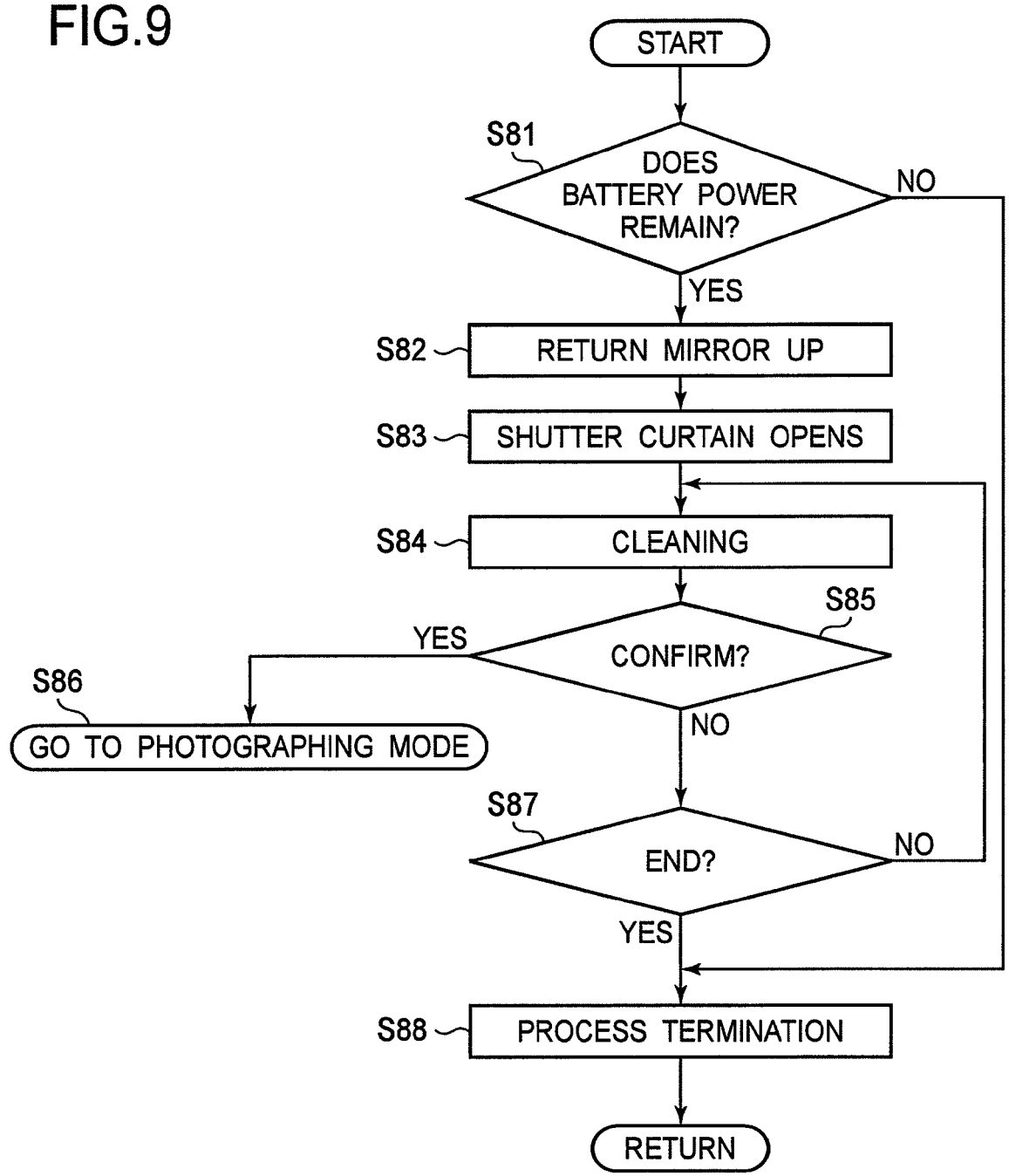
FIG. 9 is a flowchart showing a cleaning process.

The cleaning process is described with reference to FIG. 9. In step S81, it is judged whether the remaining charge in the battery 28 is enough to hold the return mirror 41 up and the shutter curtain 45 open. In the case that remainder is insufficient, the process goes to a termination process described hereinafter in step S88 and ends. In the case that the remainder is sufficient, the process goes to the next step S82.

In step S82, the return mirror 41 is kept up. In the next step, S83, the shutter curtain 45 is kept open. Following these steps, the user may easily access and clean the image sensor 40.

In step S84, the user refers to a cleaning image displayed on the display 14 and cleans the image sensor 40. After cleaning is completed, it is determined whether dust particles have been successfully removed by whether the user takes another cleaning image or not.

In the case the user confirms that dust particles have been removed from the image sensor, the process proceeds to step S86 and the digital camera 10 is set to photographing mode. Otherwise, the process proceeds to steps S87 and S88, where a termination process is performed. The termination process stops displaying a cleaning image on the display 14, closes the shutter curtain 45, and lowers the return mirror 41. Then, the cleaning process ends, and step S433 (shown in FIG. 6) is executed.

According to this embodiment, the user may pinpoint the location of dust particle 33 which is attached to the image sensor 40 and easily remove dust particle 33.

Note that the left-right inversion of image data may be omitted in step S426. Therefore, the top and bottom of the image displayed on the display 14 is the same as the top and bottom of the image sensor 40 as seen from the lens mount 44 (refer to FIGS. 3 and 8). Otherwise, the right and left of the image displayed on the display 14 is inverted with respect to the right and left of the image sensor 40 as seen from the lens mount 44, because the image has not been left-right inverted, (refer to FIGS. 3 and 8).

Figure 8:
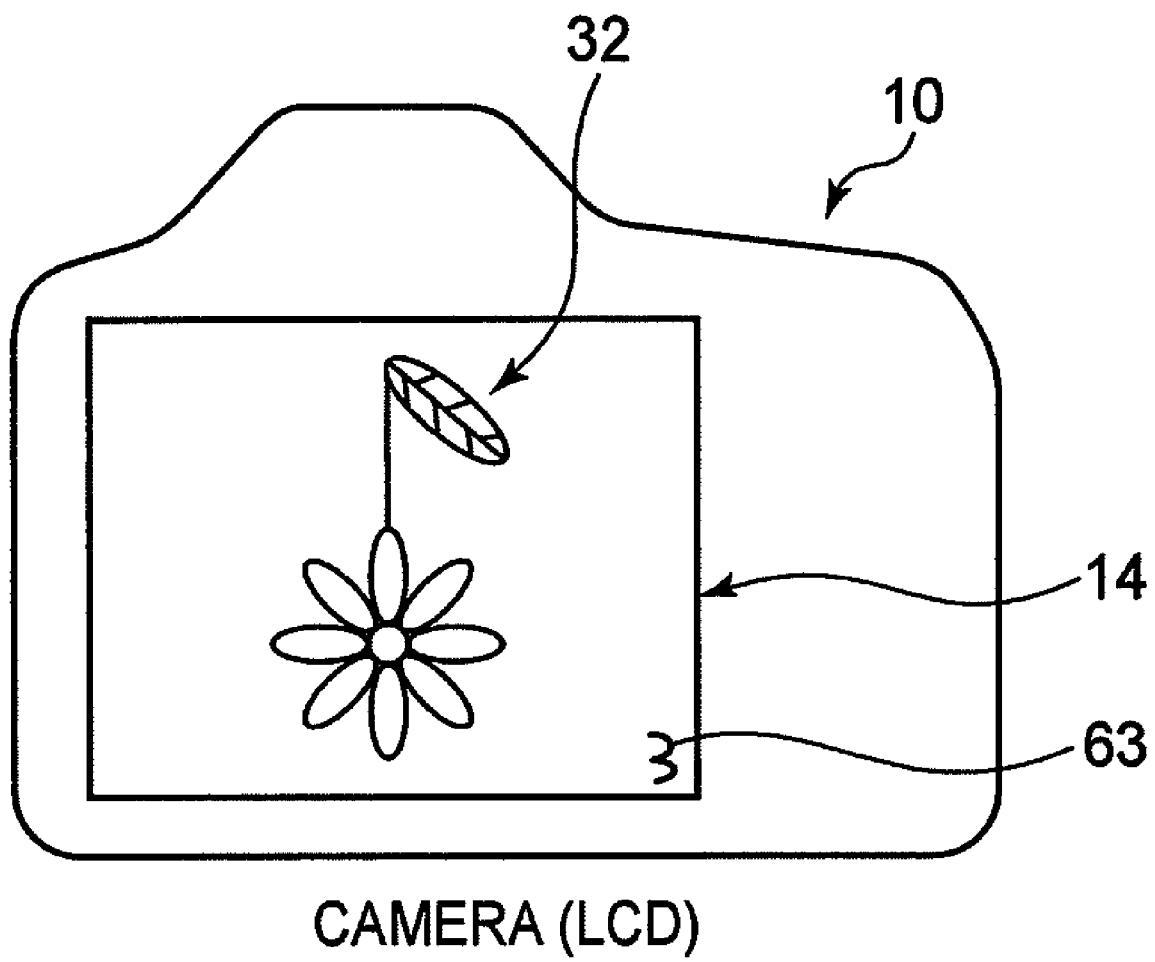
FIG. 8 is a schematic view showing a display which displays a cleaning image.

In other words, the location of a dust particle 63 is the right side of the image sensor 40 as seen from the back of the image sensor 40, and it is the right side on the display 14 (refer to FIGS. 3 and 8). That is, the location of a dust particle 63 on the image sensor 40 as seen from the lens mount 44 (refer to FIG. 3) and the location of a dust particle 63 displayed on the display 14 (refer to FIG. 8) are similar and mirror-images. Therefore, the user may precisely identify the location of dust particle 33 which is attached to the image sensor 40.

A cleaning image file may instead be stored in another place on the memory medium 27 rather than said folder. The existence of a cleaning image file is judged by reading the tag information of the image files stored on the memory medium 27.

Moreover, tag information may be omitted from the cleaning image file. The existence of a cleaning image file is judged by the successful retrieval of a cleaning image file in the "DUST" folder.

An image file may also not be stored on the memory medium, but simply displayed on the display 14. In this case, steps S426 to S429 are not executed.

In step S430, a cleaning image may be displayed on the display 14 until the cleaning process in step S432 is completed. The user may refer to a cleaning image as needed and clean the image sensor 40.

In step S81, it may be judged whether the A/C adapter 29 is connected or not, instead of, or in addition to determining the remaining battery charge. In the case the A/C adapter 29 is not connected, the process goes to step S87. In the case the A/C adapter 29 is connected, the process goes to step S82. Electrical supply to the digital camera 10 may not stopped while the cleaning process is executed, because the user cleans the image sensor 40 while connecting the A/C adapter 29 to the digital camera 10.

Figure 10:
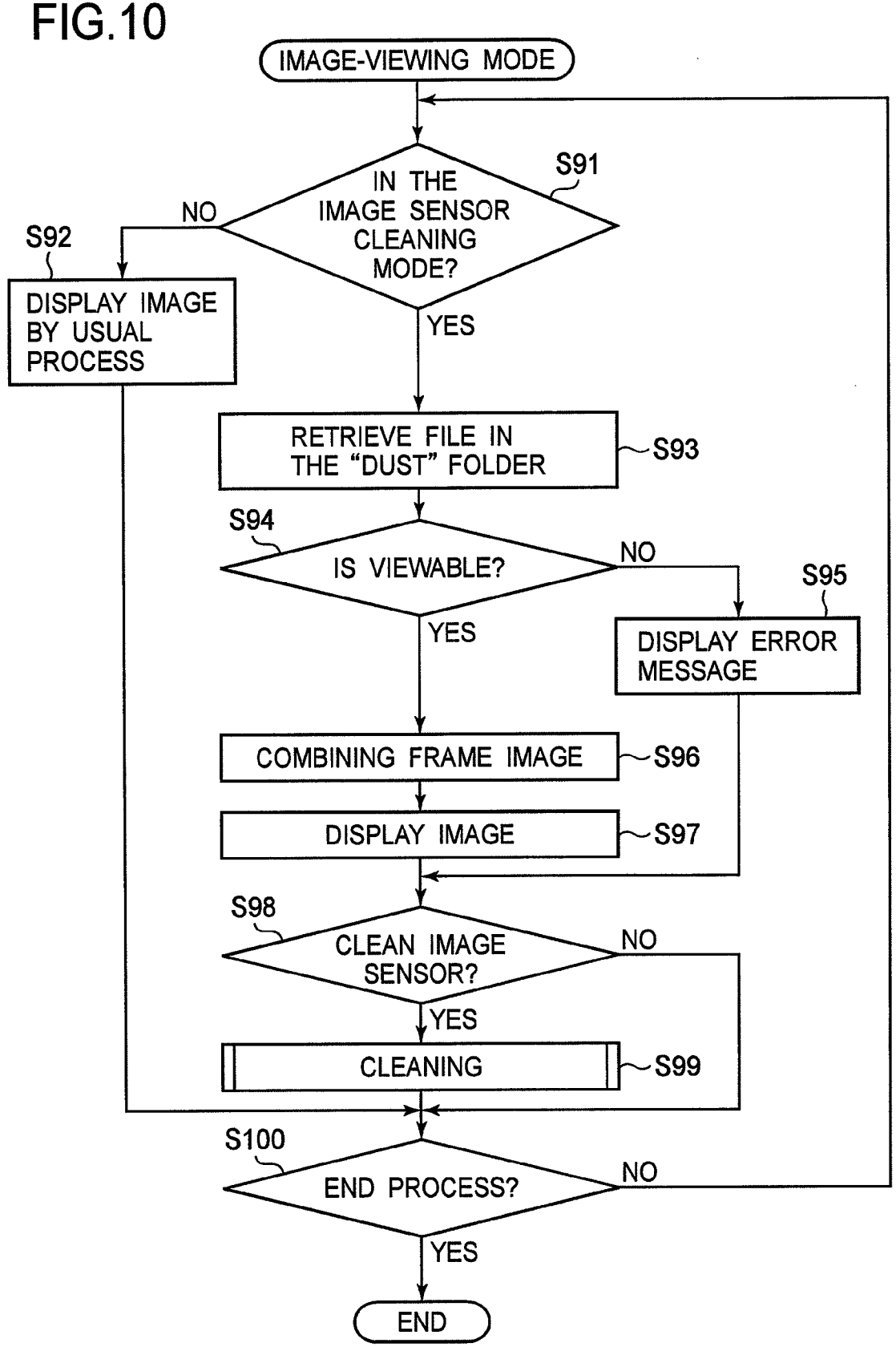
FIG. 10 is a flowchart showing a second cleaning-image display process.

The second embodiment of a digital camera is described below with reference to FIGS. 10 and 11. The constructions similar to the first embodiment are given the same numbers and the descriptions are omitted.

In this embodiment, the second cleaning-image display process is executed instead of the first cleaning-image display process. The flowchart of the process including the second cleaning-image display process is shown in FIG. 10. The second cleaning-image display process is executed when the user sets the digital camera to the image viewing mode by operating the operating switch 25.

In step S91, it is judged whether the user has set the digital camera 10 to the sensor cleaning mode or not. In the case that it is not set to the sensor cleaning mode, the process proceeds to step S92. In step S92, an image is displayed on the display 14 according to a usual process.

In the case that the digital camera 10 is set to the sensor cleaning mode, the process proceeds to step S93. In step S93, the CPU 20 retrieves a cleaning image file "DUST.JPG" from the "DUST" folder on the memory medium 27.

In step S94, it is judged whether a cleaning image can be displayed on the display 14 or not. A cleaning image can not be displayed when, for example, a cleaning image file "DUST.JPG" does not exist in the "DUST" folder, or when a cleaning image file "DUST.JPG" exists in the "DUST" folder but is broken. In such cases, the process goes to step S95, and displays an error message which means that a cleaning image file was not found or cannot be viewed. After that, the process goes to step S98.

In the case that a cleaning image file can be displayed on the display 14, i.e., a cleaning image file "DUST.JPG" exists in the "DUST" folder and is viewable, the process goes to step S96 In step S96, the CPU 20 combines a frame image 64 with a cleaning image. A frame image 64 is an image which is combined on the whole or part of the circumference of a cleaning image for decorative purposes. A frame image 64 according to the second embodiment illustrates the lens mount 44 as seen from lens 12.

Figure 11:
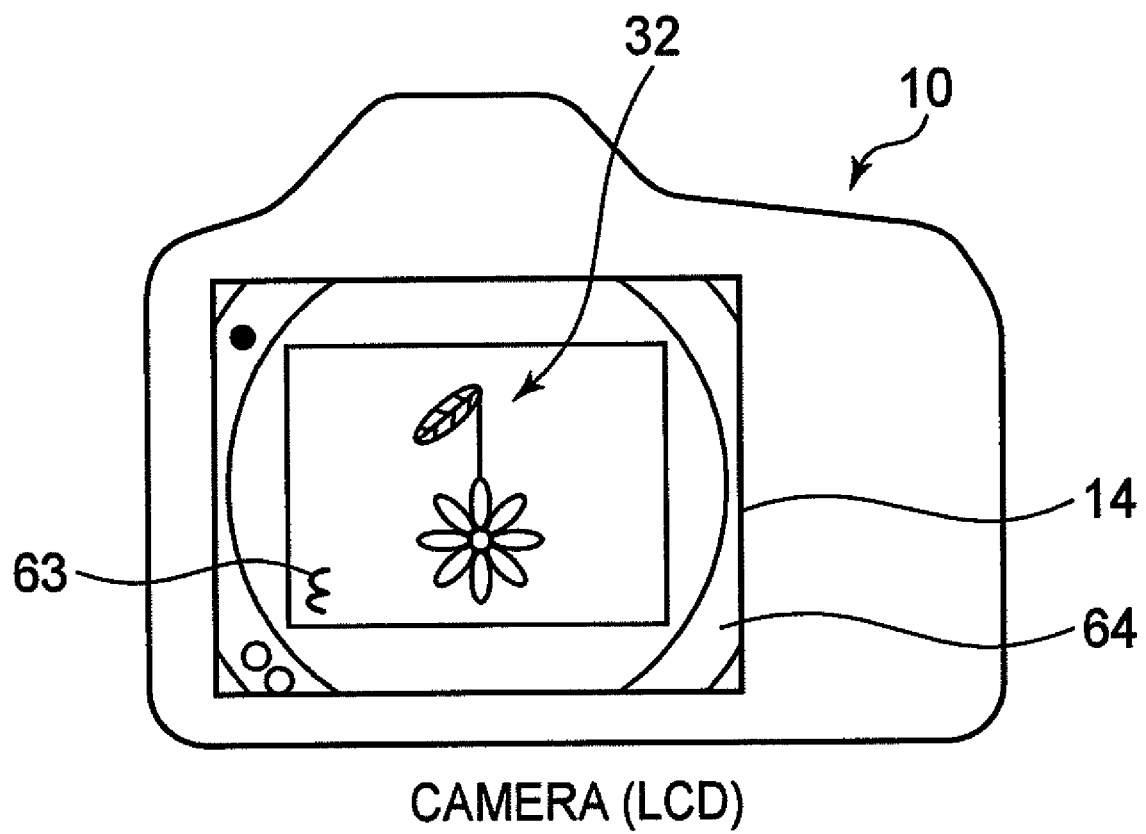
FIG. 11 is a schematic view showing a display which displays a cleaning image with a frame image.

In the next step S97, a cleaning image which combines a frame image 64 is displayed on the display 14 (refer to FIG. 11).

Steps S98 to S100 are similar to steps S431 to S432 of the first embodiment, so the descriptions are omitted.

According to this embodiment, the user may identify the location of dust particle 33 attached to the image sensor 40 in consideration of the relative location of the lens mount.

Note that the existence of a cleaning image file may be judged by retrieving tag information written in an image file without storing a cleaning image file in a certain folder, while the existence of a cleaning image file is judged by its successful retrieval from the "DUST" folder.

Figure 12:
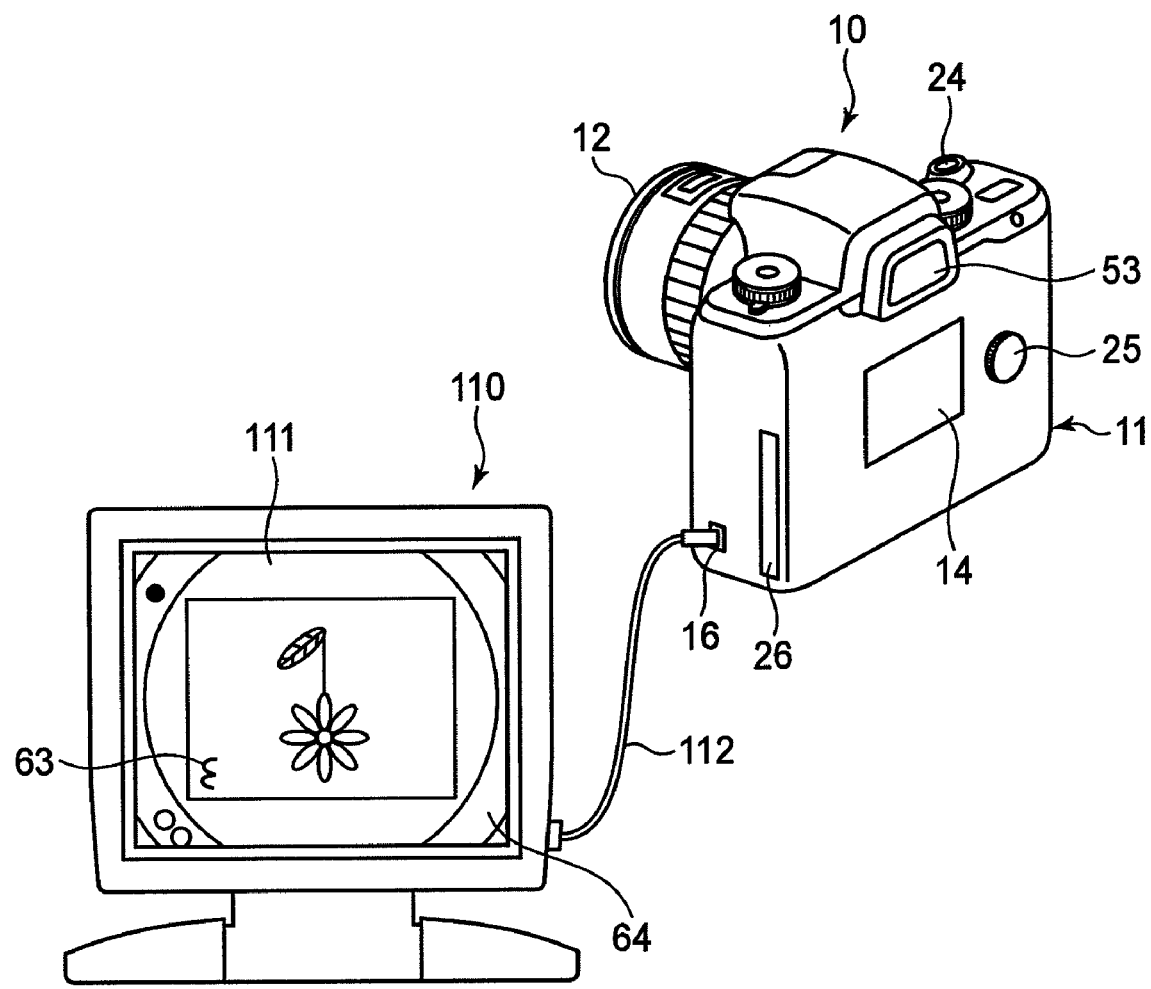
FIG. 12 is an external view of a digital camera system as the third embodiment of the present invention.

The third embodiment of a digital camera is described below with reference to FIG. 12. The constructions similar to those of the first and second embodiment are given the same numbers and the descriptions are omitted.

In this embodiment, the exterior display 110 is connected to the digital camera 10 with the video output device 16 through a cable 112. The video output device 16 processes an image to be displayed on the display 14 so as to convert it into an image format which is suitable for displaying it on the exterior display 110. The exterior display 110 may be a television display, a computer display, etc. The image format may be composite video signal, component video signal, or RGB video signal.

The exterior display 110 processes the image signal received from the digital camera 10, and creates a display image. The display image is displayed on screen 111 of the exterior display 110. The display image is a cleaning image combined with a frame image 64 in the second embodiment. That is, after step S96 of the second embodiment is executed, a cleaning image combined with a frame image 64 is displayed on the screen 111.

Note that a cleaning image according to the first embodiment may be displayed, while a cleaning image combined with a frame image 64 according to the second embodiment might not be displayed. After step S429 of the first embodiment, a cleaning image is displayed on the screen 111.

In all of the embodiments, dust particles are attached to the image sensor 40, and more particularly, dust particles are attached to the low-pass filter 48 which is provided on the front surface of the image sensor 40, and the user cleans the front surface of the low-pass filter 48.

Note that in all embodiments, the image sensor may be any device that converts light to an electrical signal, e.g., a CCD, or a CMOS chip.

A cleaning image file might also be created under different circumstances than those described hereinbefore as long as it is an image with which the user may find dust particles.

The name of the folder used for storing a cleaning image file may not be limited to "DUST", and the file name of a cleaning image file may not be limited to "DUST.JPG".

A frame image may not be limited to an image of lens mount 44. A frame image may be an image with which the user precisely identifies the directional relationship of the image sensor 40 and a cleaning image displayed on the display 14.

A cleaning image which may be stored with or without top-bottom left-right inversion is displayed on the display 14 when cleaning the image sensor 40. A cleaning image which is stored with top-bottom left-right inversion is displayed on the display 14 after top-bottom left-right inversion.

A cleaning image which is stored after top-bottom left-right inversion may be transmitted from the digital camera 10 to a personal computer. A transmitted cleaning image may undergo top-bottom left-right inversion by a program provided on a personal computer and displayed on a display connected to a personal computer at the time of cleaning.

The memory medium 27 which stores a cleaning image may be connected to a personal computer, and a cleaning image may be transmitted to the personal computer and displayed on a display which is connected to the personal computer. The user may clean the front surface of the low-pass filter 48 by referring to the displayed cleaning image.

Note that all embodiments may be applied to a compact digital camera which does not have a detachable lens. A lens is attached to a digital camera so that a user cannot detach a lens. Steps S432, S84, and S99 are not processed. A compact digital camera may indicate the location of dust particle attached to the image sensor 40, and encourages a user to send it to a manufacturer for maintenance.

Although the embodiment of the present invention has been described herein with reference to the accompanying drawings, obviously many modifications and changes may be made by those skilled in the art without departing from the scope of the invention.

The present disclosure relates to subject matter contained in Japanese Patent Application No. 2007-323815 (filed on Dec. 14, 2007), which is expressly incorporated herein, by reference, in its entirety.

The invention claimed is:

1. A digital camera comprising:
   an image-capturing device that creates a cleaning image which is used for pinpointing dust particles attached to an image sensor;
   an image processor that creates an inverted cleaning image so that the top and bottom of a subject image provided on the image sensor match the top and bottom of a subject image included in the cleaning image; and
   a display that displays the inverted cleaning image.

2. The digital camera according to claim 1, wherein said image processor creates the inverted cleaning image so that the right and left of an image formed on the image sensor match the right and left of the cleaning image.

3. The digital camera according to claim 2, wherein said display is provided on the back of said digital camera, and displays the inverted cleaning image so that the top, bottom, right, and left of an image formed on the image sensor match the top, bottom, right, and left of the inverted cleaning image.

4. The digital camera according to claim 1, further comprising an image-composing device that creates a combined cleaning image by combining the cleaning image and an orientation image which is used for discriminating the top, bottom, right, and left of the cleaning image, wherein said image processor creates the inverted cleaning image so that the top and bottom of a subject image provided on the image sensor match the top and bottom of a subject image included in the combined cleaning image, and wherein said display displays the inverted cleaning image.

5. The digital camera according to claim 1, further comprising a memory that stores the inverted cleaning image and/or the combined cleaning image.

6. The digital camera according to claim 1, further comprising a file-name determining device that assigns the cleaning image a file name indicating that the named file is an image used for cleaning.

7. The digital camera according to claim 1, further comprising a file-information writing device that writes file information indicating the status of cleaning image into the cleaning image file.

8. A single-lens reflex camera comprising:
- an image-capturing device that creates a cleaning image which is used for pinpointing dust particles attached to an image sensor;
- an image processor that creates an inverted cleaning image so that the top and bottom of a subject image provided on the image sensor match the top and bottom of a subject image included in the cleaning image;
- a display that displays the inverted cleaning image; and
- an image-composing device that creates a combined cleaning image by combining the cleaning image and a lens mount image which illustrates a lens mount as seen from a lens of said single-lens reflex camera and is used for discriminating the top, bottom, right, and left of the cleaning image;
- said image processor creating the inverted cleaning image so that the top and bottom of a subject image provided on the image sensor match the top and bottom of a subject image included in the combined cleaning image;
- said display displaying the inverted cleaning image.

9. A digital camera system comprising:
- a digital camera that comprises an image-capturing device that takes a cleaning image which is used for pinpointing dust particles attached to an image sensor, and an image processor that creates an inverted cleaning image so that the top and bottom of a subject image provided on the image sensor match the top and bottom of a subject image included in the cleaning image;
- an external receiver device that is provided on the exterior of said digital camera, and that receives the inverted cleaning image from said digital camera; and
- an external display that is provided on the exterior of said digital camera, and displays the inverted cleaning image.

* * * * *